United States Patent [19]

Kramer

[11] 4,049,243
[45] Sept. 20, 1977

[54] BLENDING AND KNEADING APPARATUS

[76] Inventor: Hyman Kramer, 50 Carter Drive, Stamford, Conn. 06902

[21] Appl. No.: 706,752

[22] Filed: July 19, 1976

[51] Int. Cl.$^2$ .......................... B01F 7/16; B01F 15/00
[52] U.S. Cl. ................................ 259/122; 259/108; 259/125; 259/DIG. 1
[58] Field of Search ................. 259/122, 107, 66, 108, 259/67, 116, 117, 118, 119, 125, 23, DIG. 1, 24, 43, 44, 185, 186; 222/156, 560

[56] References Cited

U.S. PATENT DOCUMENTS

| | | | |
|---|---|---|---|
| 1,565,970 | 12/1925 | Stanzel | 259/108 |
| 1,710,119 | 4/1929 | Smith | 222/156 |
| 2,571,366 | 10/1951 | Jennings | 259/122 X |
| 2,973,187 | 2/1961 | Wehmer | 259/122 X |
| 3,180,627 | 4/1965 | Belonga | 259/122 X |
| 3,913,896 | 10/1975 | Hawke | 259/125 |
| 3,995,840 | 12/1976 | Smader | 259/107 |

FOREIGN PATENT DOCUMENTS

| 811,385 | 8/1951 | Germany | 259/108 |
|---|---|---|---|

*Primary Examiner*—Edward J. McCarthy
*Attorney, Agent, or Firm*—Hubbell, Cohen, Stiefel & Gross

[57] ABSTRACT

In an apparatus for blending and kneading ingredients comprising an open-topped container for the ingredients to be blended and kneaded into a cohesive mass, such as dough, a lid for the container, rotary drive means mounted on the lid, and a kneader arm removably mountable to the rotary drive means for rotatable drive thereby, the improvement comprises means for mounting the lid so as to enable limited angular movement of the kneader arm axis within the container for enabling the axis of rotation of the kneader arm to sweep across the container bottom during rotation of the kneader arm as the viscosity of the mixture of ingredients being kneaded increases. This is achieved by using interengaging parts on the lid and container, preferably lugs on the lid and handles on the container, which allow for rocking and elevational movement of the lid. Preferably a flexible lid is utilized, and experiences an undulating movement enhancing the angular movement of the kneader arm axis.

14 Claims, 15 Drawing Figures

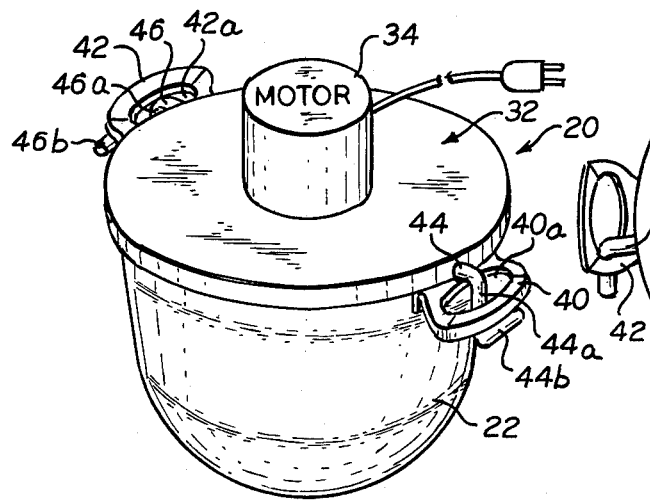
FIG. 1.
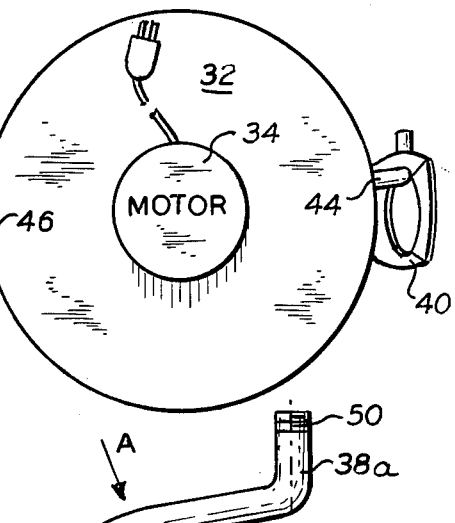
FIG. 2.
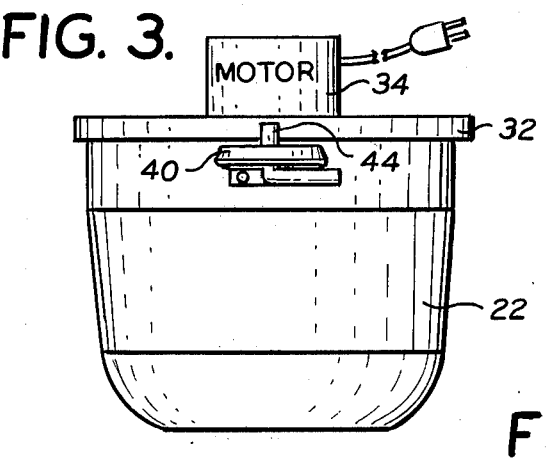
FIG. 3.
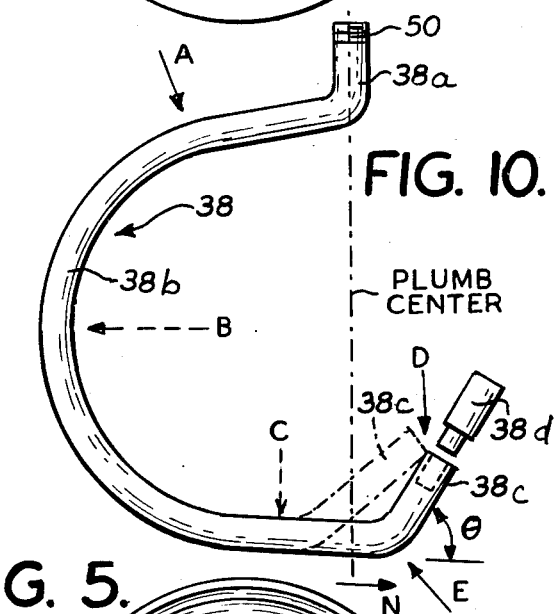
FIG. 10.
FIG. 5.
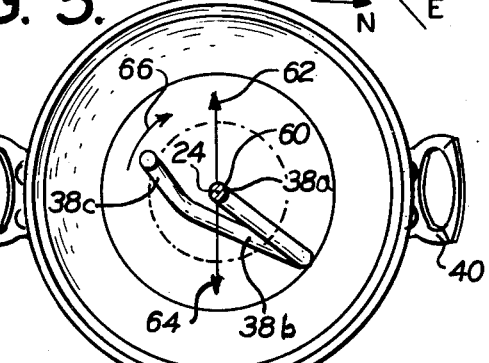
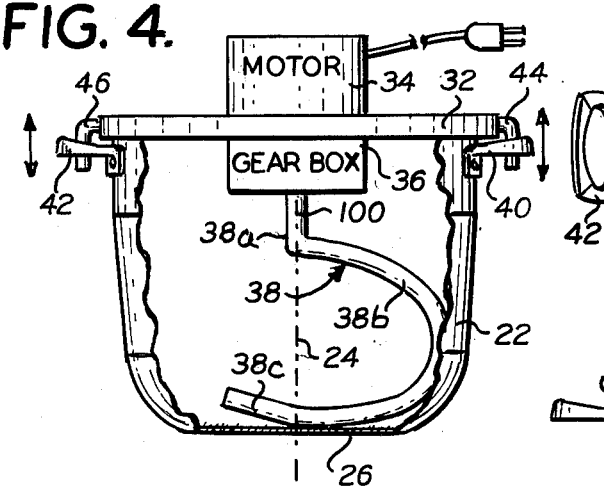
FIG. 4.
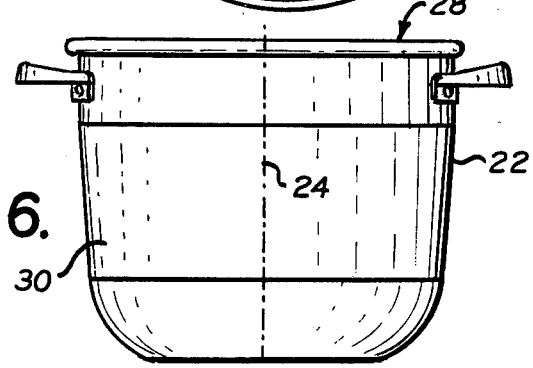
FIG. 6.

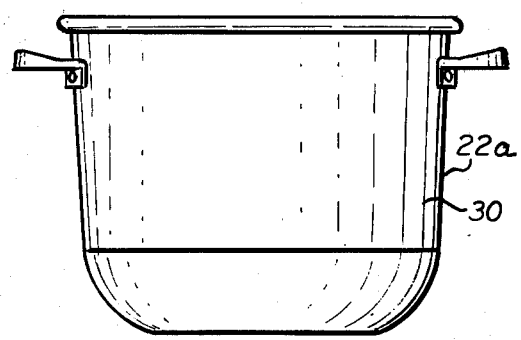
FIG. 7.
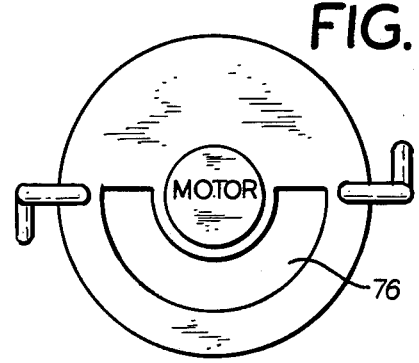
FIG. 11.
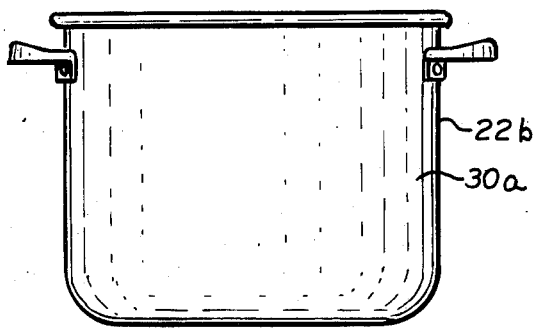
FIG. 8.
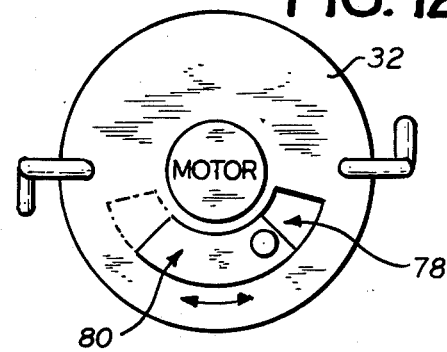
FIG. 12.
FIG. 9.
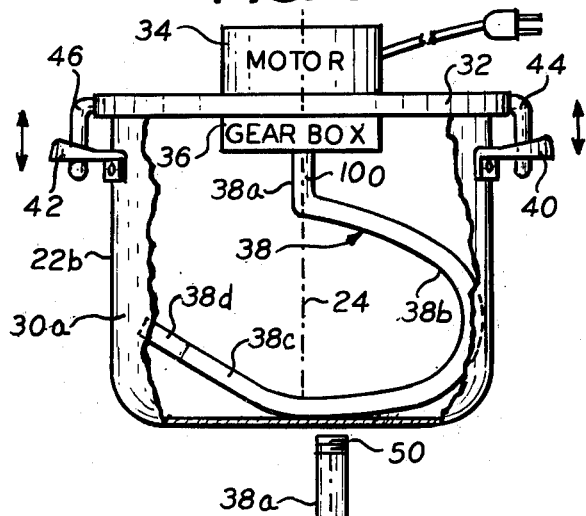
FIG. 13.
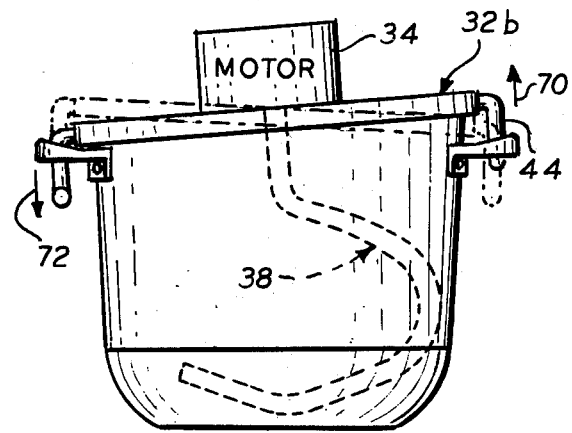
FIG. 14.
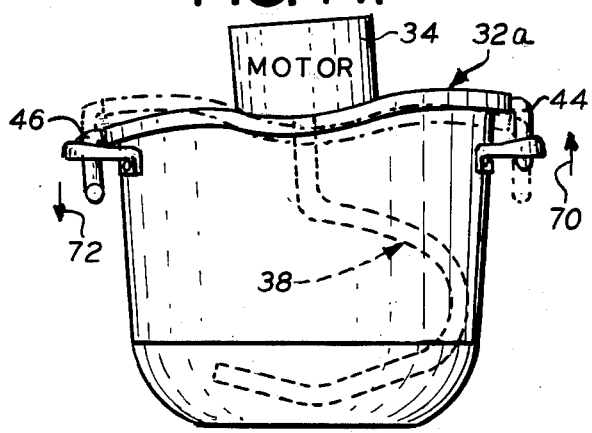
FIG. 15.
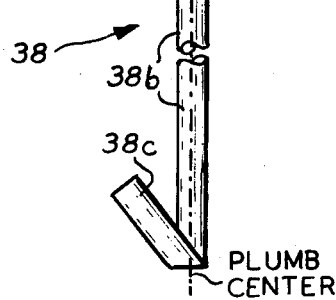

BLENDING AND KNEADING APPARATUS

BACKGROUND OF THE INVENTION

1. Field of the Invention

The present invention relates to apparatus for blending and kneading materials, for example dough, for domestic use.

2. Description of the Prior Art

The blending and kneading of ingredients, such as dough, by hand is a time consuming process and with the advent of the machine age, man has made several attempts to facilitate this process. Examples of such prior art blending and kneading devices to form dough which have been developed in an effort to facilitate this process are disclosed in U.S. Pat. Nos. 663,795; 795,082; 1,750,002; 1,778,363; 2,946,299; 3,406,643; 3,503,344; 3,751,013; 3,854,705 and 2,486,126. However, none of these prior art devices provides for a sweeping action of the kneader arm in addition to conventional rotation thereof as the viscosity of the blended ingredients increases in order to enhance this blending and kneading.

A feature of most prior art devices is that the kneader arm rotates about a fixed axis, usually in a fixed vertical position. This has two drawbacks, firstly that proper kneading of the dough is not ensured, and secondly that large forces may be required on occasions to overcome the resistance of a lump of the ingredients.

The present invention provides a motor operated device for domestic use in kneading ingredients, especially dough, in which these drawbacks are overcome by providing a movable mounting for the kneader arm which allows the axis of rotation thereof to move angularly while kneading proceeds.

In accordance with the present invention, apparatus for kneading ingredients comprises an open-topped container for the ingredients to be kneaded into a mixture having an associated viscosity, support means capable of bridging the open top of the container, and interengaging means carried by the container and the support means for removably securing the support means on the container and for resisting forces tending to rotate the support means relative to the container, rotary drive means including an electric motor carried by the support means, and a kneader arm drivable by the drive means for rotation in the container. The kneader arm is supported solely at its upper end by the drive means and is otherwise free for movement relative to the container, and the interengaging means and support means in combination provide a flexible connection between the container and the rotary drive means for enabling the axis of rotation of the kneader arm to sweep over the container bottom during rotation of the kneader arm, such as the viscosity of the mixture of ingredients being kneaded increases.

The interengaging means may be provided exclusively on opposite sides of the container and may be such as to allow rocking movement of the support means about an axis coinciding with the interengaging means. In addition, the interengaging means may allow elevational movement of the support means relative to the container in the region of the interengaging means, whereby the support means can both rise and fall as a whole relative to the container, and can rock about any horizontal axis.

The support means is preferably a lid, and this may be formed of flexible material, such as plastic, for enabling undulating movement of the mounted lid which provides angular movement of the axis of the kneader arm additional to that provided by rocking movement of the mounted lid described above. The use of a flexible lid is optional, however, and the term "flexible connection" as applied to the connection between the container and the rotary drive means is intended to include the situation where the interengaging means provides rocking and/or elevational movement of the lid without flexing of the lid itself. The lid may comprise at least a translucent portion for facilitating visual observation of the blending and kneading occurring within the container and, if desired, may contain an aperture therein, which may also have a removable cover therefor, such as a slidable cover, for enabling the entry of the ingredients into the container therethrough during the blending and kneading. The container peripheral side wall is preferably tapered inwardly to the container closed bottom portion, such as from substantially the mid-height of the side wall to the closed bottom portion, in the direction toward the center axis for enhancing the agglomeration of the ingredients towards the center axis at the container closed bottom portion.

The container may also contain straight side walls in place of the preferred tapered side walls and, accordingly, the eccentric mixing blade preferably comprises a removable blade extension portion for enabling the length of the kneader arm to be suited to containers of different size bottom portions; for example the arm may be used without the extension for tapered side wall containers and with the extension for straight side wall containers.

The aforementioned rotary drive preferably comprises a motor, such as a fractional horsepower motor and gear box for providing an output speed suitable for kneading. The motor is preferably removably mounted on the lid for facilitating cleaning of the lid after use.

To further enhance the blending and kneading operation, the kneader arm preferably has a configuration corresponding to the shape of the container interior thus rolling the ingredients against the container inner wall thereby enhancing dispersal of the ingredients. Thus, as the kneader arm axis moves angularly with movement of the lid, the kneader arm sweeps the ingredients being mixed over the container bottom to further enhance the blending and kneading of the ingredients. The kneader arm may preferably comprise a hook having a plumb center longitudinal mounting portion with an arcuate portion extending therefrom having an eccentric portion at the bottom thereof. This hook eccentric portion is preferably out of plumb with at least two planes whose intersection define plumb center and is angulated with respect to the bottom of the container.

BRIEF DESCRIPTION OF DRAWINGS

FIG. 1 is a perspective view of the presently preferred embodiment of a blending and kneading apparatus in accordance with the present invention;

FIG. 2 is a top plan view of the apparatus of FIG. 1;

FIG. 3 is a side elevational view of the apparatus of FIG. 1 from the right side thereof;

FIG. 4 is a front elevational cut away view of the apparatus of FIG. 1 cut away to show the kneader arm in position in the container of FIG. 1;

FIG. 5 is a top plan view of the apparatus of FIG. 1 with the cover removed for clarity for purposes of illustrating the position of the kneader arm in the container of FIG. 1;

FIG. 6 is a front elevational view of the container of the apparatus of FIG. 1 with the cover removed;

FIG. 7 is a front elevational view similar to FIG. 6 of an alternative embodiment of a container for use in the apparatus of FIG. 1;

FIG. 8 is a front elevational view similar to FIG. 6 of another alternative embodiment of a container for use in the apparatus of the invention;

FIG. 9 is a front elevational cut away view similar to FIG. 4 of another alternative embodiment of the apparatus of the invention employing the container of FIG. 8 and an extension on the kneader arm;

FIG. 10 is an exploded diagrammatic illustration of a typical presently preferred embodiment of the kneader arm of the present invention utilized with the apparatus of FIGS. 1 through 9;

FIG. 11 is a top plan view similar to FIG. 2 of an alternative lid for use with the embodiments of FIGS. 1 through 9;

FIG. 12 is a top plan view similar to FIG. 11 of another alternative embodiment of a lid for use with the embodiments of the apparatus illustrated in FIGS. 1 through 9;

FIG. 13 is a front elevational diagrammatic illustration of the embodiment of FIG. 1 illustratively showing the lid rocking in response to rotational drive of the kneader arm;

FIG. 14 is a front elevational diagrammatic illustration, similar to FIG. 13, on the embodiment of FIG. 1 illustratively showing the lid undulating in response to rotation of the kneader arm; and FIG. 15 is a front elevation diagrammatic illustration of the kneader arm embodiment of FIG. 10.

DETAILED DESCRIPTION OF THE PREFERRED EMBODIMENTS

Referring now to the drawings and initially to FIGS. 1 through 6 thereof, the preferred embodiment of a blending and kneading apparatus, generally referred to by the reference numeral 20, in accordance with the present invention is shown. The blending and kneading apparatus 20 comprises a container 22 for the ingredients to be blended and kneaded, such as into dough. As shown in FIG. 6, the container 22 has a longitudinal center axis 24 about which it is symmetrical, a closed bottom 26, an open top 28, and a closed peripheral side wall 30 extending about the center axis 24 between the closed bottom 26 and the open top 28. As further shown in FIG. 6, the peripheral side wall 30 is inwardly tapered towards the center axis 24, through its mid-section and down to its bottom portion. As shown in FIG. 7, if desired, this inward taper of the peripheral side wall 30 could start from the open top 28 as opposed to from a point just slightly below the top as illustrated in FIG. 6. Furthermore, if desired, the container 22b, as shown in FIG. 8, may contain a straight, non-tapered peripheral side wall 30a in place of tapered peripheral side wall 30 without departing from the spirit and scope of the present invention although, as previously mentioned, it has presently been found that the deflection of the material or ingredients towards the center axis 24 as a result of the inward tapering of the peripheral side wall 30 enhances the blending and kneading of the mixture.

As further shown, the blending and kneading apparatus 20 includes a lid or cover 32 for the container 22 with rotary drive means, such as preferably a conventional fractional horsepower motor 34, such as less than 1/64 horsepower by way of example, removably mounted on the lid 32, as will be described in greater detail hereinafter. The motor 34 is centrally mounted on the lid 32 and is conventionally connected or geared to a conventional gear box 36 for providing rotational drive at the output of the gear box 36. A kneader arm 38 is removably connectable to the gear box drive 36 for rotational drive by the motor 34. This kneader arm 38 will be described in greater detail hereinafter, with reference to FIGS. 4, 5, 10 and 15. The motor, gear box and kneader arm combination is suitable for kneading a desired quantity of dough, such as being sufficient to provide 14 one pound loaves of bread; the motor being suitably protected so as not to burn out during this operation.

The aforementioned lid 32 and motor 34 arrangement to which the kneader arm 38 is removably connected, is removably mounted to close the open top 28 with an upper portion of the kneader arm 38 downwardly extending along the longitudinal center axis 24 as shown in FIGS. 4 and 5. Two opposed handles 40 and 42 extend outwardly from the peripheral side wall 30 of the container 22 which handles 40 and 42 have slots 40a and 42a which are elongated in the circumferential direction for a purpose to be described in greater detail hereinafter. Handles 40 and 42 are located at opposite ends of a diameter of the container. A pair of opposed lug members 44 and 46 extend outwardly from the lid 32 and, as shown in FIGS. 1 through 4, are substantially L-shaped having downwardly extending portions 44a and 46a which pass through the slots 40a and 42a and limit the rotational movement of the lid 32. These lug members 44 and 46 further comprise tangentially extending portions 44b and 46b, respectively, which are suitably spaced below handles 40 and 42 to engage therewith so as to preferably limit the elevational movement of the lid 32 to a functionable small movement, such as less than ½ inch, at the region of the handles 40 and 42. If desired, lugs 44 and 46 could cooperate with handles 40 and 42 from the outside thereof rather than from within slots 40a and 42a. During operation, the kneader arm 38 rotates clockwise as seen from above and the torque reaction on the lid maintains lugs 44 and 46 in the locking position shown. Of course, the lug arrangement could be reversed and counterclockwise rotation provided.

Referring now to the kneader arm 38, this kneader arm 38 is shown in greater detail in FIGS. 4, 5, 9, 10 and 15. As shown therein, the kneader arm 38 preferably includes an upstanding longitudinal connection portion 38a preferably located along plumb center 100, such as a portion containing screw threads 50 thereon for removably mounting the kneader arm 38 to the gear box drive 36 by connection to a shaft driven by the motor 34 and gear box 36 for rotatable drive of the kneader arm 38. This portion 38a as shown in FIGS. 4 and 9 is preferably located along the center axis 24, which axis 24 and plumb center 100 being coaxial, when the kneader arm 38 is drivingly connected to the gear box 36. The kneader arm 38 also includes an arcuate hook portion 38b whose radial extent from the center axis 24 is less than the interior radius of the container 22 peripheral side wall 30, so as to be spaced away therefrom. The arcuate hook portion 38b preferably includes a bottom portion 38c extending therefrom which is preferably out of plumb (FIGS. 10 and 15) with at least two planes whose intersection defines a plumb center 100 and is preferably angulated with respect to the plane of the closed bottom 26 of the container 22, extending upwardly therefrom. Although eccentric portion 38c is shown as being out of plumb forward of center 100 in FIGS. 4, 9, 10 and 15, it could, if desired, be out of plumb rearward or sideward of center 100, or out of plumb in direction with respect to any of the points of a compass about center 100. The kneader arm bottom portion 38c is positioned close to the central area of container bottom 26 and extends up toward the opposed interior side of the peripheral side wall 30. As is seen in FIGS. 4 and 10, however, the eccentric portion 38c is off-set from the axis 24 so as to sweep around the central area of the bottom 26. The off-set position of the inner end of portion 38c (that adjoining the hook portion 38b) may be achieved by having the hook portion 38b bent in three dimensions so as not to lie in a single plane (FIGS. 10 and 15). Specifically, portion 38b may have a slight helical twist so that during its rotation, clockwise as seen from above, material is caused to move slightly upwardly along this hook portion or may be planar along plumb center 100 as shown in FIGS. 10 and 15.

As shown in FIG. 10, the eccentric portion 38c of the kneader arm 38 may be provided with a push on, friction-fit, longitudinal extension 38d. The purpose of the longitudinal extension 38d is to enable the eccentric portion 38c to essentially further extend outwardly to a point adjacent the interior of a straight peripheral wall 30a container, such as shown in FIGS. 8 and 9, with portion 38c preferably being designed so as to have an extent only sufficient to be well clear of the interior of the presently preferred tapered peripheral side wall 30 of container 22 or 22a described by way of example with reference to FIGS. 4 and 5. It should be noted that eccentric portion 38c preferably falls considerably short of the wall 22 or 30a. The only time it gets close to the wall is when using a straight walled container as in FIG. 9 and when portion 38d is added thereto. Of course, a larger size kneader arm could be utilized for a straight walled container, if desired, instead of adding adapter portion 38d. The curved portion of arm 38 catches the outwardmost material during blending and presses this material against the walls of the container causing a kneading condition. Similarly, end portion 38c presses the material against the bottom 36 of the container 22.

As will be described in greater detail hereinafter, as the kneader arm 38 rotates due to rotational drive by motor gear box arrangement 34-36, the high viscosity of the material being kneaded will cause the lid 32 to rock back and forth (FIG. 13), and may cause undulation of the lid (FIG. 4), depending on whether the lid 32 is a flexible material. This movement of the lid 32 causes the axis of the kneader arm 38 to move angularly during the kneading operation, so that the lower portions of the arm have a sweeping circular pendulum type of movement, as illustratively shown in FIG. 5 by arrows 62 and 64, in addition to the rotational movement of the kneader arm 38, as shown illustratively by arrow 66 in FIG. 5, the axis of rotation of the kneader arm 38 sweeping over the container bottom 26 during rotation of the kneader arm 38 as the viscosity of the material being kneaded increases. This additional movement enhances the blending and kneading of the ingredients. This flexibility of movement also inhibits stalling of the motor 34, since if the kneader arm 38 meets a strong obstruction the lid 32 will give enough for the arm to move over this obstruction before the motor 34 stalls. It should be noted that only the lid or cover 32 preferably moves, the container 22 preferably remaining essentially stationary during any such undulating or rocking of the lid 32 and requiring no extraneous means, such as suction cups or a carriage, to hold the container 22 in position.

If the lid 32 is made out of a flexible material, such as plastic, as is preferred, then the operation of the device is as follows, assuming by way of example, that the ingredients being blended and kneaded are for dough. The conventional ingredients for mixing dough, that is yeast, flour and water, are placed in the container 22 in the desired proportion depending on the quantity of dough desired, these proportions being conventional. Thus, as the dough ingredients are mixed by the rotational drive of the kneader arm 38, the viscosity or flowability of the dough mixture increases. As the mixture gets more viscous or doughy, the flexible lid 32a illustrated in FIG. 14 rocks back and forth and begins to undulate as shown in the exaggerated view of FIG. 14, this undulation increasing as the viscosity of the dough mixture continues to increase toward the desired dough consistency. It had been found that for the aforementioned fractional horsepower motor, when it is utilized to provide dough sufficient for one to fourteen one pound loaves of bread, this undulation begins after a short period of time of mixing. The aforementioned plastic top 32a is preferably on the order of 80 mils thick so as to provide sufficient flexibility to enable the aforementioned undulation, with this flexibility or undulation enabling the kneader arm 38 to avoid becoming stalled on meeting high viscosity lumps of the dough mixture. This is accomplished due to the lid 32a having a tendency to lift up first on one side, such as the side containing lug 44, by way of example, generally in the direction of arrow 70 until portion 44b contacts the underside of handle 40 causing the lid 32a to start to rock and undulate as the kneader arm 38 rotates. As this rotation continues, the lid is also caused to undulate in a manner, illustratively shown in FIG. 14, about an axis approximately coincident with a diameter joining the container handles, by angular movements occurring in the motor. In fact, the rocking in this mode is generally more pronounced than in the mode shown in FIG. 13. In practice, the undulation occurs about axes which rotate as arm 38 rotates, but the undulation may vary in intensity depending on the axis on which it is occurring at any moment.

Similarly, if the lid 32 is comprised of a non-flexible material, such as metal, then the lid 32b, as shown in FIG. 13, will rock about a rotating axis, instead of undulating in a fashion similar to that of FIG. 14. That is, as the kneader arm 38 encounters resistance to rotation due to increased viscosity of the dough, the lid 32 will first lift up on one side such as at lug 44 generally in the direction of arrow 70 with lug 46 thereby going in a downward direction generally in the direction of arrow 72 until the resistance to rotation of the kneader arm 38 is overcome with rotation of the kneader arm 38 thereby continuing, and subsequently causing, the lid 32b to lift at different positions around the container 22.

It should be further noted that the lugs or connections which connect the lid 32 to the container 22 can be any type of conventional connector arrangement which will limit the rotational and elevational movement of the lid 32 in response to rotation of the kneader arm 38 with such arrangement preferably being provided by a pair of opposed connections.

It should be further noted that preferably the motor 34 housing is removable from the gear box 36, or may be taken off together therewith, to allow water submersion of the lid 32 for facilitating cleaning thereof. Furthermore, as shown in FIG. 11, the lid 32 may preferably comprise a solid opaque cover having a translucent or clear observation window 76 for visually observing the blending and kneading operation occurring within the container 22. Similarly, as shown in FIG. 12, the lid 32 may include an aperture 78 therein which may be closed by a removable or slidable cover 80, with the dough ingredients to be blended being addable to the interior of the container 22 through aperture 78. In such an instance, the cover 80 may be a translucent or clear slidable cover so as to permit visual observation of the blending and kneading operation occurring within the interior of the container 22. Of course, if desired, the entire lid 32 can be comprised of a translucent or clear material so as to permit visual observation of the blending and kneading operation occurring within the interior of the container 22. Although the lid 32 is shown as having the motor 34 directly connected thereto, if desired, a bridge may be built across the opening with the bridge attached to the container 22 or to the handles 40 and 42 and the motor 34 being mounted on the bridge or hanging from the bridge and drivingly connected therefrom through the lid 32, if desired, to the kneader arm 38 for rotational drive thereof. In addition, it should be noted that the motor 34 preferably runs opposite to the direction of the threads which connect the kneader arm 38 to the motor shaft, when threads are utilized for such connection, so that the kneader arm 38 does not unwind from the shaft in operation. It should be further noted that, if desired, the motor shaft may also include an extension piece (not shown) for connection of a manual handle thereto so as to enable selection between manual turning operation and automatic operation via the motor 34 with a conventional gear connection being provided for selecting between such manual and automatic operation. It should further be noted that in the aforementioned extent of the eccentric portion 38c, this portion 38c is bent upwardly so as to preferably be a considerable distance away from the interior wall of the container (FIG. 4). This eccentric portion 38c enhances the blending of the ingredients in the center of the container 22 at the bottom portion 26 thereof.

It is to be understood that the above described embodiments of the invention are merely illustrative of the principles thereof and that numerous modifications and embodiments of the invention may be derived within the spirit and scope thereof, such as by maintaining the lid stationary while the motor section is free to move as it drives the kneader arm.

What is claimed is:

1. Apparatus for kneading ingredients into a mixture having an associated viscosity, comprising an open-topped container for said ingredients, support means capable of bridging the open top of the container, and interengaging means carried by the container and the support means for removably securing the support means on the container and for resisting forces tending to rotate the support means relative to the container, rotary drive means including an electric motor carried by said support means, and a kneader arm drivable by said drive means for rotation in the container about an axis of rotation, said kneader arm being supported solely at its upper end by said drive means and being otherwise free for movement relative to the container, said container having a bottom, said interengaging means and support means in combination comprising connection means between said container and said rotary drive means for enabling both rotation of said kneader arm about said axis of rotation and angular displacement of said axis of rotation with respect to said container bottom during said rotation for enabling the axis of rotation of the kneader arm to sweep over said container bottom during rotation of said kneader arm.

2. Apparatus according to claim 1 wherein said interengaging means allow rocking movement of said support means about an axis approximately coinciding with the interengaging means for enabling said angular displacement during said kneader arm rotation, said interengaging means being situated on opposite sides of the center of the container.

3. Apparatus according to claim 1 wherein said interengaging means allow relative elevational movement between parts of said support means and container adjacent said interengaging means for enabling said angular displacement during said kneader arm rotation.

4. Apparatus according to claim 1 wherein said support means comprises a lid formed of a flexible material for enabling undulating movement of a central portion of the lid carrying said drive means during rotation of said kneader arm for enabling said angular displacement during said kneader arm rotation.

5. Apparatus according to claim 4 wherein said flexible lid is substantially comprised of a plastic.

6. Apparatus according to claim 1 wherein said support means is a lid having at least a portion thereof transparent for facilitating visual observation of kneading in the container.

7. Apparatus according to claim 1 wherein said support means has an aperture therein for enabling the entry of said ingredients into said container.

8. Apparatus according to claim 7 wherein said support means is a lid and further comprises a removable cover for said aperture.

9. Apparatus according to claim 1 wherein said kneader arm comprises a removable extension portion for enabling the outer end of said kneader arm to be located to suit containers of different size bottom portions.

10. Apparatus according to claim 1 wherein said support means is a lid and wherein said motor is removably mounted on said lid for facilitating cleaning of said lid.

11. Apparatus according to claim 1 wherein said motor comprises a fractional horsepower motor.

12. Apparatus according to claim 10 wherein said drive means comprises a motor and a gear box.

13. Apparatus according to claim 1 wherein said support means comprises a lid formed of a non-flexible material for enabling rocking movement of a central portion of the lid carrying said drive means during rotation of said kneader arm for enabling said angular displacement during said kneader arm rotation.

14. A kneader arm for use in an apparatus for kneading ingredients into a mixture having an associated viscosity comprising an open-topped container for said ingredients, support means capable of bridging the open top of the container, and interengaging means carried by the container and the support means for removably securing the support means on the container and for resisting forces tending to rotate the support means relative to the container, rotary drive means including an electric motor carried by said support means, said kneader arm being drivable by said drive means for rotation in the container about an axis of rotation and being supported solely at its upper end by said drive means and being otherwise free for movement relative to said container, said container having a bottom, said interengaging means and support means in combination comprising connection means between said container and said rotary drive means for enabling both rotation of said kneader arm about said axis of rotation and angular displacement of said axis of rotation with respect to said container bottom during said rotation for enabling the axis of rotation of the kneader arm to sweep across said container bottom during rotation of said kneader arm as the viscosity of the mixture of ingredients being kneaded increases; said kneader arm comprising a longitudinal mounting portion at said upper end extending along plumb center for said kneader arm for mounting said kneader arm to said drive means along said axis of rotation, an arcuate hook portion extending at one end from said longitudinal portion and being concave with respect to plumb center, and an eccentric bottom portion extending from that end of said arcuate hook portion opposite to said one end, said eccentric bottom portion being out of plumb with at least two planes whose intersection defines plumb center and being angulated at an acute angle with respect to a plane normal to the intersecting planes defining plumb center.

* * * * *